United States Patent
Wachter et al.

(10) Patent No.: US 10,982,343 B2
(45) Date of Patent: Apr. 20, 2021

(54) PLATING COMPOSITIONS FOR ELECTROLYTIC COPPER DEPOSITION, ITS USE AND A METHOD FOR ELECTROLYTICALLY DEPOSITING A COPPER OR COPPER ALLOY LAYER ONTO AT LEAST ONE SURFACE OF A SUBSTRATE

(71) Applicant: Atotech Deutschland GmbH, Berlin (DE)

(72) Inventors: Philipp Wachter, Berlin (DE); Christina Pfirrmann, Berlin (DE); Stefan Kretschmer, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 16/642,932

(22) PCT Filed: Oct. 16, 2018

(86) PCT No.: PCT/EP2018/078281
§ 371 (c)(1),
(2) Date: Feb. 28, 2020

(87) PCT Pub. No.: WO2019/091721
PCT Pub. Date: May 16, 2019

(65) Prior Publication Data
US 2020/0347504 A1   Nov. 5, 2020

(30) Foreign Application Priority Data
Nov. 9, 2017  (EP) .................................... 17200836

(51) Int. Cl.
*C25D 3/38* (2006.01)
*C25D 3/58* (2006.01)
*C09B 17/02* (2006.01)

(52) U.S. Cl.
CPC ............... *C25D 3/38* (2013.01); *C09B 17/02* (2013.01)

(58) Field of Classification Search
CPC .................................... C25D 3/38; C25D 3/58
USPC .......................................... 205/239, 297, 298
See application file for complete search history.

(56) References Cited

U.S. PATENT DOCUMENTS

| 2,707,166 | A | 4/1955 | Brown |
| 3,328,273 | A * | 6/1967 | Creutz ..................... C25D 3/38 205/298 |
| 4,347,108 | A | 8/1982 | Willis |
| 5,976,341 | A | 11/1999 | Schumacher et al. |
| 6,099,711 | A | 8/2000 | Dahms et al. |
| 6,518,182 | B1 | 2/2003 | Ishikawa et al. |
| 7,857,961 | B2 | 12/2010 | Hayashi et al. |
| 7,872,130 | B2 | 1/2011 | Brunner et al. |
| 9,040,700 | B2 | 5/2015 | Krol et al. |
| 9,243,339 | B2 | 1/2016 | Pearson |
| 2005/0133376 | A1 | 6/2005 | Opaskar et al. |
| 2005/0189231 | A1* | 9/2005 | Capper ................... C25D 3/565 205/246 |
| 2009/0038949 | A1 | 2/2009 | Hayashi et al. |
| 2013/0264213 | A1 | 10/2013 | Roeger-Goepfert et al. |
| 2014/0238868 | A1* | 8/2014 | Li ............................ C25D 7/12 205/296 |

FOREIGN PATENT DOCUMENTS

| DE | 947656 | | 8/1956 |
| EP | 2025778 | A2 | 2/2009 |
| JP | 2000248397 | A | 9/2000 |
| JP | 2013044007 | A | 3/2013 |
| JP | 2013044035 | A | 3/2013 |
| WO | 2004057061 | A1 | 7/2004 |
| WO | 2012040417 | A1 | 3/2012 |

OTHER PUBLICATIONS

PCT/EP2018/078281; PCT International Search Report and Written Opinion of the International Searching Authority dated Nov. 27, 2018.
Decision to Grant for Korean Application No. 10-2020-7008219 dated Jun. 24, 2020 and its partial English translation.

* cited by examiner

*Primary Examiner* — Edna Wong
(74) *Attorney, Agent, or Firm* — Renner, Otto, Boisselle & Sklar, LLP

(57) ABSTRACT

The present invention relates to a plating composition for electrolytic copper deposition, comprising copper ions, halide ions and at least one acid, at least one benzothiazole compound, at least one phenazine dye and at least one ethanediamine derivative. The present invention further concerns the use of above plating composition and a method for electrolytically depositing a copper or copper alloy layer onto at least one surface of a substrate.

17 Claims, No Drawings

PLATING COMPOSITIONS FOR ELECTROLYTIC COPPER DEPOSITION, ITS USE AND A METHOD FOR ELECTROLYTICALLY DEPOSITING A COPPER OR COPPER ALLOY LAYER ONTO AT LEAST ONE SURFACE OF A SUBSTRATE

The present application is a U.S. National Stage Application based on and claiming benefit and priority under 35 U.S.C. § 371 of International Application No. PCT/EP2018/078281, filed 16 Oct. 2018, which in turn claims benefit of and priority to European Application No. 17200836.9 filed 09 Nov. 2017, the entirety of both of which is hereby incorporated herein by reference.

FIELD OF THE INVENTION

The present invention concerns plating compositions for electrolytic copper deposition, their use and a method for electrolytically depositing a copper or copper alloy layer onto at least one surface of a substrate.

BACKGROUND OF THE INVENTION

Various methods and deposition solutions for copper plating are used to produce decorative bright and levelled surfaces, large surfaces for instance, on metals or plastic materials. Among others, they are used to form ductile layers, for example in the field of decorative coatings for sanitary or automotive equipment where there is a need for intermediate copper layers for subsequent deposition of different metal layers e.g. for corrosion protection and/or decorative layers.

A homogeneous and bright appearance is especially required for final metal layers on the surface of the substrate. The homogeneity of the appearance can be easily achieved on substrates which have no complex shape because the current density distribution during electroplating of the copper layer is within a narrow range.

Various additives known as brighteners, levelers, surfactants can be added which are responsible for the quality of the deposits in view of e.g. distribution of brightness and plain deposition and also for the characteristics of the deposition bath in view of applicable current density and bath stability.

The utilization of certain dyes as phenazinium compounds (or phenazine dyes as they are referred to in the art) and of the derivatives thereof for producing bright copper layers has long been known. These phenazinium compounds, which are described for example in DE 947 656 C1, are used as additives in a bath for the electrolytic production of copper coatings. Such dyes have certain disadvantages, in particular when used in large quantities. For example, if spilled they are difficult to remove and they are very expensive adding significantly to the cost of the copper plating process. Further, many commercial phenazinium compounds still contain certain amounts of the used starting materials which are often toxic such as aniline and nitrobenzene.

U.S. Pat. No. 6,518,182 B1 discloses the use of a copper electrolyte comprising Tetronic TR 704, Janus Black and MPS (example 2).

JP 2013-044035 A1 and JP 2013-044007 A1 report two-step plating processes wherein copper electrolytes are used comprising a brightener, an accelerator and optionally at least one of the following components a) a lubricant comprising a nitrogen-containing organic compound not belonging to amides and amino acids (b) a polymer surfactant or (c) chloride.

Additionally, some copper electrolytes described above do not allow the use of high current densities as is desired for electroplating. The additives described are only effective in a narrow range of current density.

For substrates having complex shapes and/or structured surfaces known methods and plating solutions are not sufficient. It is not possible to produce decorative bright and conformal surfaces that have no undesirable effects such as over-levelled structures, hydrodynamic defects, pittings and nodules. Furthermore, when using known solutions, it is not possible to achieve good levelling performance without compromising the bright appearance of the surface layer and using higher current densities. Especially small structures with protrusions, different deep recesses or increments show undesired different copper growth resulting in uneven surface appearance wherein the copper layer will not smoothly follow the shape of the structures.

Furthermore, it is often not possible to achieve a reproducible quality of particularly bright, i.e. mirror-polished, as well as well levelled and ductile copper deposits. Another shortcoming of the prior art is that the roughness of copper layers formed from copper electrolytes known in the art is not only too high for many applications but also quickly increases over the lifetime of the bath. Also, when substrates having defects such as scratches or other irregularities are used, it is of paramount importance that the copper electrolyte compensates for that at least in part and allows for smooth copper layers to be formed which ideally do not show the irregularities of the underlying substrates anymore.

The roughness of the copper layers may have an effect on the visual appearance of the copper layer, e.g. on their gloss. One explanation for the above-mentioned roughness increases may be the fast consumption of individual components in the electrolyte which can be partially overcome by replenishment thereof. However, the replenishment of such compounds has to be arduously adapted to this need as not all compounds are consumed in the ratio and an inaccurate addition of component may result in further undesired effects. An improvement of this arduous optimization is thus highly desired in the art.

OBJECTIVE OF THE PRESENT INVENTION

Thus, one object of the present invention is to circumvent the disadvantages of the known plating compositions and methods during the metallization of workpieces, such as of metal or plastic substrates and more specifically to provide additives allowing for reproducibly manufacturing particularly bright as well as levelled and ductile copper coatings.

Another object of the invention is to make it possible to avoid the shortcomings of the prior art and provide a plating composition and a method for electrolytic copper deposition.

It is further objective of the present invention to allow for an improved levelling effect of the plating composition which in turns results in less rough copper deposits to be formed on a surface of a substrate, in particular on a surface of a substrate which shows irregularities or defects such as scratches.

SUMMARY OF THE INVENTION

Above-captioned objectives are solved by the inventive plating composition for electrolytic copper deposition comprising copper ions, halide ions and at least one acid, characterized in that the plating composition further comprises
(a) at least one benzothiazole compound represented by the following formula (BT)

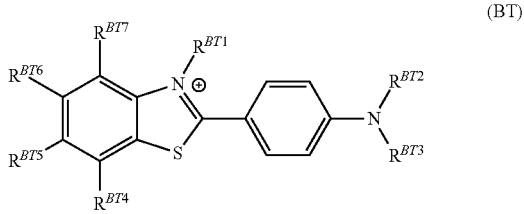

(BT)

wherein
$R^{BT1}$ is selected from the group consisting of substituted and unsubstituted alkyl group, substituted and unsubstituted aryl group and substituted and unsubstituted alkaryl group;
$R^{BT2}$ and $R^{BT3}$ are independently substituted and unsubstituted alkyl groups;
each of $R^{BT4}$, $R^{BT5}$, $R^{BT6}$ and $R^{BT7}$ are independently selected from the group consisting of hydrogen, substituted and unsubstituted alkyl group and substituted, unsubstituted oxyalkyl group and

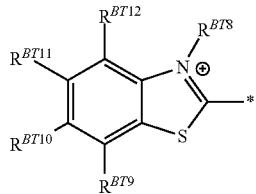

wherein $R^{BT8}$ is selected from the group consisting of substituted and unsubstituted alkyl group, substituted and unsubstituted aryl group and substituted and unsubstituted alkaryl group;
each of $R^{BT9}$, $R^{BT10}$, $R^{BT11}$, $R^{BT12}$ are independently selected from the group consisting of hydrogen, substituted and unsubstituted alkyl group, substituted and unsubstituted oxyalkyl group and sulfonic acid group;
(b) at least one phenazine dye; and
(c) at least one ethanediamine derivative represented by the following formula (ED)

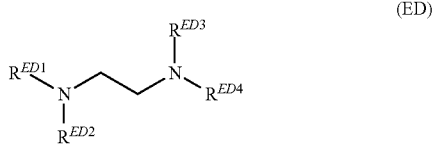

(ED)

wherein
$R^{ED1}$, $R^{ED2}$, $R^{ED3}$ and $R^{ED4}$ are independently selected from the group consisting of substituted and unsubstituted oligo(oxyalkanediyl) group; and substituted and unsubstituted poly(oxyalkanediyl) group.
Above objectives are also solved by the use of the inventive plating composition to electrolytically deposit a copper or copper alloy layer onto at least one surface of a substrate.

Above objectives are further solved by the inventive method for electrolytically depositing a copper or copper alloy layer onto at least one surface of a substrate comprising the following method steps
i) providing the substrate;
ii) contacting the substrate with the inventive plating composition; and
iii) applying an electrical current between the substrate and at least one anode; and thereby depositing said layer onto the at least one surface of the substrate.

It was found by the inventors that components a) benzothiazole compound represented by the following formula (BT), b) at least one phenazine dye and c) the at least one ethanediamine derivative represented by the following formula (ED) act synergistically in plating composition for electrolytic copper deposition in achieving above objectives and advantages described in this specification (see for example Comparative Examples 1 to 3 vs. Inventive Examples 1 and 2). Preferred embodiments of the present invention are inter alia given in the dependent claims.

The inventive plating composition, its use and the inventive method for electrolytically depositing a copper or copper alloy layer allow for more levelled copper or copper alloy layers to be formed. A very broad range of current density can be applied in the inventive method resulting in said layers further to be glossy. Moreover, their brightness and mirror-polished appearance is also achievable over a broad range of current density in the inventive method and with the inventive plating composition.

Advantageously, the inventive plating composition can be used over a prolonged plating duration without any substantial change of properties of the electrolytically deposited copper or copper alloy layers. Exemplarily, the levelling properties are retained for a significantly prolonged period of time (see Inventive Example 3 and Comparative Example 4).

It is another advantage of the present invention that the copper layers have desirable mechanical properties, e.g. they are ductile and adhere well to the underlying surface of the substrate.

It is still another advantage of the present invention that the plating composition for electrolytic copper deposition according to the invention has a very high throwing power. Exemplarily, it allows for the formation of very uniform copper layers. This effect is particularly advantageously present over a wide range of current density which further facilitates the process and allows for further process optimizations.

DETAILED DESCRIPTION OF THE INVENTION

Percentages throughout this specification are weight-percentages (wt.-%) unless stated otherwise. Concentrations given in this specification refer to the volume or mass of the entire solutions/compositions unless stated otherwise. In case, concentrations of chemicals are given, said concentrations are given in reference of the pure chemicals (e.g. $H_2SO_4$), even if they are usually used as formulations such as e.g. 96 wt.-% sulfuric acid. The terms "deposition" and "plating" are used interchangeably herein. Also, "layer" and "deposit" are also used synonymously in this specification.

It is understood that embodiments of the present invention described in this specification can be combined unless this is technically not feasible or specifically excluded.

The term "alkyl group" according to the present invention comprises branched or unbranched alkyl groups comprising cyclic and/or non-cyclic structural elements, wherein cyclic structural elements of the alkyl groups naturally require at least three carbon atoms. C1-CX-alkyl group in this specification and in the claims refers to alkyl groups having 1 to X carbon atoms (X being an integer). C1-C8-alkyl group for example includes, among others, methyl, ethyl, n-propyl, iso-propyl, n-butyl, iso-butyl, sec-butyl, tert-butyl, n-pentyl, iso-pentyl, sec-pentyl, tert-pentyl, neo-pentyl, hexyl, heptyl and octyl. Substituted alkyl groups may theoretically be obtained by replacing at least one hydrogen by a functional group. Unless stated otherwise, alkyl groups are preferably selected from substituted or unsubstituted C1-C8-alkyl groups, more preferably from substituted or unsubstituted C1-C4-alkyl groups because of their improved solubility in water.

The term "aryl group" according to the present invention refers to ring-shaped aromatic hydrocarbon residues, for example phenyl or naphthyl where individual ring carbon atoms can be replaced by N, O and/or S, for example benzothiazolyl. Furthermore, aryl groups are optionally substituted by replacing a hydrogen atom in each case by a functional group. The term C5-CX-aryl group refers to aryl groups having 5 to X carbon atoms (optionally replaced by N, O and/or S and X being an integer) in the ring-shaped aromatic group. Unless stated otherwise, aryl group are preferably selected from substituted or unsubstituted C5-C10-aryl groups, more preferably from substituted or unsubstituted C5-C6-aryl groups because of their improved solubility in water. C5-aryl groups naturally require a heteroatom being present such as N or O. Strong reducing agents such as alkyl lithium may be used to prepare aromatic cyclopentadiene-anions from suitable cyclopentadiene derivatives but these anions are not stable in water and are thus preferably not used. In various chemical formulae in the art and herein, phenyl groups are represented as "Ph".

The term "alkanediyl group" is the corresponding derivative of an alkyl group having two bonding sites. Sometimes alkanediyl groups are referred to as alkylene groups in the art. C1-CX-alkanediyl group in this specification (X being an integer) and in the claims refers to alkanediyl groups having 1 to X carbon atoms, e.g. 1 to 12. Examples of alkanediyl groups are 1,1-methandiyl, 1,2-ethanediyl, 1,1-ethanediyl, 1,1-propanediyl, 1,2-propanediyl, 1,3-propanediyl. Unless stated otherwise, alkanediyl groups are preferably selected from substituted or unsubstituted C1-C8-alkanediyl groups, more preferably from substituted or unsubstituted C2-C4-alkanediyl groups because of their improved solubility in water.

The term "alkaryl group" according to the invention refers to hydrocarbon groups comprising at least one aryl group and at least one alkyl group such as benzyl (—$CH_2$—$C_6H_5$) and p-tolyl (—$C_6H_4$—$CH_3$). The bonding of such an alkaryl group to other moieties may occur via the alkyl or the aryl group of the alkaryl group. Above-described preferences for the alkyl and aryl groups apply for alkaryl groups mutatis mutandis. Particularly preferred alkaryl groups are benzyl and tolyl.

The term "oxyalkyl group" according to the invention refers to hydrocarbon groups comprising at least oxygen atom and at least one alkyl group. Typically, they are bound via said oxygen atom. Examples of oxyalkyl group include methoxy (—O—$CH_3$), ethoxy (—O—$C_2H_5$), propoxy (—O—$C_3H_7$), butoxy (—O—$C_4H_9$) and the like.

In the art, the term "poly(oxyalkanediyl) group" is often used interchangeably with the terms "polyether", "polyalkylene glycol", "polyoxyalkylene" and the like. Poly(oxyalkanediyl) groups can be prepared for example by (ring-open) polymerization of suitable epoxides such as alkylene oxides like ethylene oxide, propylene oxide, butylene oxide and/or styrene oxide. Generally, in the art the prefixes "oligo" and "poly" are not always well distinguished. Herein "oligo" refers to compounds having 2 to 4 repeating units and "poly" to those having five or more repeating units. In the context of oligo(oxyalkanediyl) and poly(oxyalkanediyl) groups: An oligo(oxyalkanediyl) group is a shorter derivative of above-named with fewer repeating units derived from above epoxides, e.g. 2 to 4. Poly(oxyalkanediyl) groups usually have 5 or more repeating units.

The term "allylsulfonic acid group" according to the invention refers to hydrocarbon groups comprising at least one sulfonic acid group (–$SO_3H$) or a salt thereof (preferably an ammonium sulfonic acid salt, an alkaline sulfonic acid salt or an earth alkaline sulfonic acid salt) bound to at least one alkyl group. C1-CX-alkylsulfonic acid group in this specification (X being an integer) and in the claims refers to alkylsulfonic acid groups having 1 to X carbon atoms, e.g. 1 to 8.

Unless stated otherwise, above-defined groups are substituted (also referred to as "functionalized" in the art) or unsubstituted (also referred to as "unfunctionalized" in the art). Functional groups as substituents are preferably selected from the group consisting of hydroxyl (—OH), amino (–$NR_2$ wherein each R is independently selected from the group consisting of hydrogen, alkyl group and aryl group, preferably both R are hydrogen), oxy (=O) and carboxyl (—$CO_2H$) to improve the solubility of the relevant compounds in water.

If more than one residue (substituent) is to be selected from a certain group, each of the residues is selected independently from each other unless stated otherwise herein. An asterisk in a chemical formula is intended to highlight the bonding site of said formula. In case where a chemical formula and a name of a compound do not match, the chemical formula shall take precedence. Further, the trivial name shall take precedence over an IUPAC name which also serves to further illustrate the subject matter.

Hereinafter, details of the present invention and preferred embodiments will be described which were found to be particularly effective in solving above objectives and in achieving the advantages described herein.

The inventive plating composition is usually an aqueous solution. The term "aqueous solution" means that the prevailing liquid medium, which is the solvent in the solution, is water. Further liquids, which are miscible with water, as for example alcohols and other polar organic liquids may be added. For its ecologically benign characteristics, it is preferred to use water only (i.e. more than 99 wt.-% based on all solvents in the composition, more preferably more than 99.9 wt.-% based on all solvents).

The inventive plating composition comprises copper ions. Copper ions are included in the plating composition by using at least one water-soluble copper salt or copper complex. Such water-soluble copper salts and copper complexes are preferably selected from the group consisting of copper sulfate, copper alkyl sulfonates such as copper methane sulfonate, copper arylsulfonates such as copper p-toluene sulfonate and copper phenyl sulfonate, copper halides such as copper chloride, copper acetate, copper citrate, copper fluoroborate, copper oxide, copper carbonate and mixtures of the aforementioned. More preferably, copper sulfate, copper alkylsulfonates or mixtures of the aforementioned are used as the copper ion source. Copper sulfate is most preferred.

Preferably, the concentration of the copper ions ranges from 10 to 100 g/L, preferably from 20 to 80 g/L and more preferably from 30 to 60 g/L. Too high concentrations of copper ions sometimes result in solubility issues, depending for example on the at least one acid used, whereas too small concentrations occasionally decelerate the deposition of the copper or copper alloy layer.

More preferably, 95 weight percent or more of all reducible metal ions in the inventive plating composition ions are copper ions; even more preferably 99 weight percent or more of all reducible metal ions in the inventive plating composition ions are copper ions. Reducible metal ions in the context of the present invention are understood as those metal ions which can be deposited to form a metallic layer or metallic alloy layer under the given conditions. Such reducible metal ions for example include gold ions, tin ions, silver ions, zinc ions, nickel ions, cobalt ions, palladium ions, iron ions and naturally copper ions. These reducible metal ions do not include alkaline and earth alkaline ions as they cannot be reduced to their metallic state under the normally applied conditions. Even more preferably, the inventive copper plating bath is free of further reducible metal ions other than copper ions (disregarding traces of impurities commonly present in technical raw materials and typically employed redox couples such as $Fe^{3+}/Fe^{2+}$, i.e. less than 0.1 wt.-% of such further reducible metal ions in relation to the copper ions). Particularly, the inventive plating composition is free of intentionally added zinc ions and/or tin ions. Co-deposition of zinc and/or tin with copper reduces the electrical conductivity of the formed deposits significantly compared to pure copper rendering such co-deposit of zinc and copper unsuitable for the use in the electronics industry and significantly changes the appearance of such deposits in terms of color, gloss and the like. The inventive plating composition is particularly useful for depositing pure copper layers (≥99 wt.-% copper, preferably ≥99.9 wt.-% copper).

The inventive plating composition comprises halide ions. Preferably, the halide ions are selected from the group consisting of chloride ions, bromide ions, iodide ions and mixtures of the aforementioned. The halide ions more preferably are chloride ions. The halide ions are preferably added to the inventive plating composition as alkaline halides such as sodium chloride, potassium chloride and lithium chloride and/or as hydrogen halide such as hydrogen chloride. Halide ions may also in part or entirely be added as component of other additives described herein, e.g. as counterion of the at least one phenazine dye. Preferably, the total concentration of the halide ions ranges from 10 to 250 mg/L, more preferably from 50 to 150 mg/L and even more preferably from 70 to 130 mg/L.

The inventive plating composition comprises at least one acid. In one embodiment of the present invention, the at least one acid is a Brønsted acid. Preferably, the at least one acid is selected from the group consisting of sulfuric acid, organosulfuric acid (such as alkylsulfonic acids like methanesulfonic acid, ethanesulfonic acid and propanesulfonic acid, arylsulfonic acids like benzenesulfonic acid and para-toluenesulfonic acid and alkanolsulfonic acids), fluoroboric acid, phosphoric acid and mixtures of the aforementioned; preferably the at least one acid is sulfuric acid or a mixture comprising sulfuric acid is used because of its high conductivity.

Preferably, the total concentration of the at least one acid ranges from 0.1 to 1.5 mol/L, preferably from 0.3 to 1.3 mol/L and more preferably from 0.6 to 0.82 mol/L. The total concentration of the at least one acid means that if more than one acid is used, the overall concentration of all acids used is preferably in above-defined ranges (this reasoning applies mutatis mutandis to all total concentrations described herein). Said concentration ranges in particular improve the levelling properties of the inventive plating composition.

The inventive plating composition comprises at least one benzothiazole compound represented by the formula (BT). The at least one benzothiazole compound represented by the formula (BT) is referred to as "benzothiazole compound" hereinafter.

The at least one benzothiazole compound is cationic and thus a counterion is usually present. Any anion may be used as counterion. Such counterion is preferably selected from the group consisting of hydroxide, hydrogensulfate, sulfate, methanesulfonate, acetate, chloride, bromide, iodide, toluenesulfonate and methanesulfate ($CH_3$—O—$SO_3^-$). More preferably, said counterion is selected from the group consisting of chloride and methansulfate.

Typically, above counterions are used in quantities sufficient to neutralize the one cationic charge of the benzothiazole compound. It is for example sufficient if one sulfate ion is present for two benzothiazole compounds to satisfy the underlying electroneutrality requirement.

Preferably, $R^{BT1}$ is selected from the group consisting of substituted and unsubstituted C1-C3-alkyl group, substituted and unsubstituted phenyl group and substituted and unsubstituted benzyl group. More preferably, $R^{BT1}$ is selected from the group consisting of methyl group and benzyl group.

Preferably, $R^{BT2}$ and $R^{BT3}$ are independently substituted and unsubstituted C1-C3-alkyl groups. More preferably, $R^{BT2}$ and $R^{BT3}$ are independently selected from methyl group and ethyl group. In one embodiment of the present invention, $R^{BT2}$ and $R^{BT3}$ are selected to be the same group to facilitate the preparation of such compounds.

Preferably, each of $R^{BT4}$, $R^{BT5}$, $R^{BT6}$ and $R^{BT7}$ are independently selected from the group consisting of hydrogen, substituted and unsubstituted C1-C5-alkyl group, substituted and unsubstituted C1-C5-oxyalkyl group and

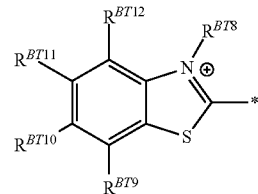

wherein $R^{BT8}$ is selected from the group consisting of substituted and unsubstituted C1-C5-alkyl groups and each of $R^{BT9}$, $R^{BT10}$, $R^{BT11}$ and $R^{BT12}$ are independently selected from the group consisting of hydrogen, substituted and unsubstituted $C1$-$C_5$-alkyl groups and sulfonic acid group.

More preferably, each of $R^{BT4}$, $R^{BT5}$, $R^{BT6}$ and $R^{BT7}$ are independently selected from the group consisting of hydrogen, methyl group, ethyl group, methoxy group, ethoxy group and

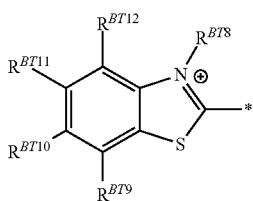

wherein $R^{BT8}$ is selected from the group consisting of methyl group and ethyl group and each of $R^{BT9}$, $R^{BT10}$, $R^{B11}$ and $R^{BT12}$ are independently selected from the group consisting of hydrogen, methyl group, ethyl group and sulfonic acid group.

Preferably, $R^{BT11}$ and $R^{BT12}$ are hydrogen.

In a preferred embodiment of the present invention, $R^{BT6}$ and $R^{BT7}$ are hydrogen and $R^{BT4}$ and $R^{BT5}$ are selected from above-defined groups. More preferably, $R^{BT4}$, $R^{BT6}$ and $R^{BT7}$ are hydrogen and $R^{BT5}$ is selected from above-defined groups.

Preferably, one or none of $R^{BT4}$, $R^{BT5}$, $R^{BT6}$ and $R^{BT7}$ is

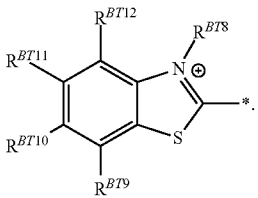

In a preferred embodiment of the present invention, the benzothiazole compound is represented by formula (BT-1)

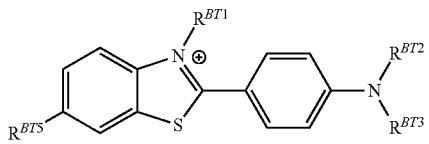

(BT-1)

wherein
$R^{BT1}$ is selected from the group consisting of substituted and unsubstituted C1-C3-alkyl group;
$R^{BT2}$ and $R^{BT3}$ are independently selected from methyl group and ethyl group; and
$R^{BT5}$ is selected from the group consisting of methyl group, ethyl group, methoxy group, ethoxy group and

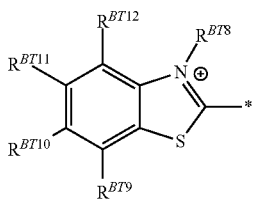

wherein $R^{BT8}$ is selected from the group consisting of methyl group and ethyl group and each of $R^{BT9}$, $R^{BT10}$, $R^{BT11}$ and $R^{BT12}$ are independently selected from the group consisting of hydrogen, methyl group, ethyl group and sulfonic acid group. More preferably, $R^{BT11}$ and $R^{BT12}$ are hydrogen. In this embodiment, $R^{BT4}$, $R^{BT6}$ and $R^{BT7}$ are hydrogen.

Particularly preferred, the at least one benzothiazole compound is selected from the group consisting of thioflavin T (4-(3,6-dimethyl-1,3-benzothiazol-3-ium-2-yl)-N,N-dimethylaniline chloride, basic yellow 1, CAS no. 2390-54-7) and thioflavin S (direct yellow 7, CAS no. 1326-12-1).

Preferably, the total concentration of the at least one benzothiazole compound ranges from 0.01 to 100 mg/L, preferably from 0.05 to 50 mg/L and more preferably from 0.1 to 20 mg/L.

Concentrations above said maximum thresholds occasionally may result in defects in the deposited copper or copper alloy layers such as blisters and pitting. Concentrations below said minimum thresholds may not always be effective enough.

The inventive plating composition comprises at least one phenazine dye. Phenazine dyes per se are known in the art and described inter alia in Ullmann's Encyclopedia of Industrial Chemistry, 7$^{th}$ ed., 2011, Wiley-VCH Verlag GmbH & Co. KG, Weinheim, Chapter "Azine Dyes", in particular see pp. 480-489.

In many cases, it is not possible to provide a certain chemical structure to the at least one phenazine dye. The at least one phenazine dye is monomeric, oligomeric or polymeric. In one embodiment of the present invention, a mixture of phenazine dyes comprising monomeric and oligomeric phenazine dyes or monomeric and polymeric phenazine dyes or oligomeric and polymeric phenazine dyes or monomeric, oligomeric and polymeric phenazine dyes is used. It is exemplarily possible that the monomeric and the oligomeric phenazine dye are based on the same dye (e.g. safranine and oligosafranine and polysafranine may be used). The same applies naturally to all other combinations mentioned above.

The at least one phenazine dye is preferably a diaminophenazine dye. The at least one phenazine dye is more preferably selected from the group consisting of eurhodine dyes, basic safranine dyes, acid safranine dyes, indulines, nigrosines and aniline black.

Eurhodine dyes include inter alia Neutral Violet (3-amino-7-(dimethylamino)phenazin-5-ium, CAS no. 167382-91-4), 3-((2-chloro-2-hydroxyethyl)(3-chloro-2-hydroxypropyl)amino)-7-(dimethylamino)phenazin-5-ium (with a suitable counterion such as chloride) and Neutral Red (3-amino-7-(dimethylamino)-2-methylphenazin-5-ium, CAS no. 553-2-2). Basic safranine dyes include inter alia Safranine T (Basic Red 2, 3,7-Diamino-2,8-dimethyl-5-phenyl-phenazinium chloride, CAS no. 477-73-6), trimethyl safranine (3,7-diamino-2,8-dimethyl-5-(o-tolyl)phenazin-5-ium chloride), phenosafranine (3,7-diamino-2-methyl-5-phenylphenazin-5-ium chloride, CAS no. 81-93-6), 3-amino-7-N,N-diethylamino-2-methyl-5-phenylphenazinium chloride, Rhodulin Red (3-amino-2-methyl-7-(methylamino)-5-phenylphenazin-5-ium chloride, CAS no. 10130-52-6), Rhodulin Violet (CAS no. 23279-70-1), Methylene Violet (3-Amino-7-(diethylamino)-5-phenylphenazinium chloride, CAS no. 4569-86-2) and mauvine (CAS no. 6373-22-4) being a mixture encompassing inter alia mauveine A, mauveine B, mauveine B2 and mauveine C (see for example J. S. S. de Melo et al., "A study in Mauve Unveiling Perkin's Dye in Historic Samples", Chemistry—A European Journal, 2008, volume 14, p. 8507-8513) and safranine azo dyes such as Janus Black (Basic Black 2, 3-(diethylamino)-7-((4-hydroxyphenyl)diazenyl)-5-phenylphenazin-5-ium chloride, CAS no. 4443-99-6) and Janus Green B (8-(4-Dimethylaminophenyl)diazenyl-N,N-diethyl-10-phenylphenazin-10-ium-2-amine chloride, CAS no. 2869-83-2). Safranine azo dyes bear a group which is bound by a diazo moiety (*—N═N—*) selected from the group consisting of aromatic amines, phenols and N-heterocycles which is not a phenazine group like a safranine dye.

Preferably, the at least one (monomeric) safranine is free of diazo groups (*—N═N—*), in particular if said group is used to attach one of aromatic amines, phenols and N-heterocycles like in the case of safranine azo dyes. This in particular is the case for monomeric safranine dyes which are preferably free of diazo groups. Monomeric safranine dyes comprising one or more diazo groups have been found by the inventors to be much less suitable for solving the problem underlying the present invention. In particular, above described synergism with the at least one benzothiazole compound and the at least one ethanediamine derivative is much less pronounced in this case. Examples of such monomeric safranine azo dyes which are less favorably used as the at least one phenazine dye are Janus Black (Basic Black 2, 3-(diethylamino)-7-((4-hydroxyphenyl)diazenyl)-5-phenylphenazin-5-ium chloride, CAS no. 4443-99-6) and Janus Green B (8-(4-Dimethylaminophenyl)diazenyl-N,N-diethyl-10-phenylphenazin-10-ium-2-amine chloride, CAS no. 2869-83-2). Oligomeric or polymeric safranine dyes which employ a diazo group as coupling moiety between the individual safranine moieties as repeating groups do not show the undesired effects.

In one embodiment of the present invention, the safranine dye is not 3-amino-6-dimethylamino-2-methylphenazine monohydrochloride for the same reason outlined for the safranine azo dyes.

Acid safranine dyes include inter alia Acid Cyanine BF (CAS no. 6448-97-1), Supranol Blue BL (CAS no. 6378-88-7) and Wool Fast Blue FFG (CAS no. 6837-47-4).

In particular, Indulines, Nigrosines and Aniline Black typically form a mixture of different compounds depending on the starting materials and reaction conditions. Indulines for example include 7-amino-5-phenyl-2,3-bis(phenylamino)phenazin-5-ium chloride, 5-phenyl-2,3,7-tris(phenylamino)phenazin-5-ium chloride and 5-phenyl-2,3,7,8-tetrakis(phenylamino)phenazin-5-ium chloride. They are for example available and preferably used as Indamine Blue B (CAS no. 6471-73-4) and Fast Blue Base RF (CAS no. 8004-98-6).

Preferable Nigrosines to be used are Acid Black 2 (CAS no. 8005-03-6), Solvent Black 5 (CAS no. 11099-03-9) and Solvent Black 7 (CAS no. 8005-02-5).

In one embodiment of the present invention, the phenazine dye is not 3-amino-6-dimethylamino-2-methylphenazine monohydrochloride.

Preferably, the basic safranine dye is not a basic safranine azo dye.

Even more preferably, the at least one phenazine dye is selected from the group consisting of basic safranine dyes and acid safranine dyes. Still more preferably, the at least one phenazine dye is a basic safranine dye and yet even more preferably a basic safranine dye which is not a basic safranine diazo dye.

In this particularly preferred embodiment of the present invention, the at least one phenazine dyes is a monomeric, oligomeric or polymeric basic safranine dye (which is not a basic safranine azo dye). Said monomeric basic safranine dye can be represented by formula (P):

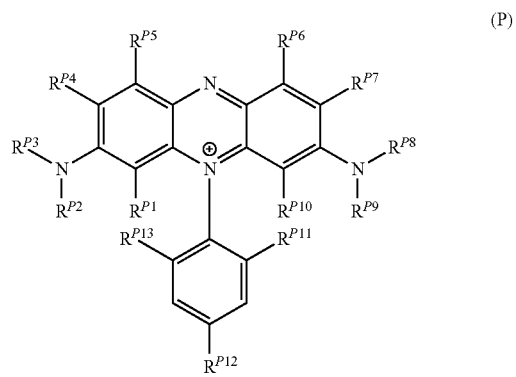

wherein
$R^{P1}$, $R^{P4}$, $R^{P5}$, $R^{P6}$, $R^{P7}$ and $R^{P10}$ are independently selected from the group consisting of hydrogen, substituted and unsubstituted alkyl group, substituted and unsubstituted aryl group and substituted and unsubstituted alkaryl group;
$R^{P2}$, $R^{P3}$, $R^{P8}$ and $R^{P9}$ are independently selected from the group consisting of hydrogen, substituted and unsubstituted alkyl group, substituted and unsubstituted aryl group and substituted and unsubstituted alkaryl group; and
$R^{P11}$, $R^{P12}$ and $R^{P13}$ are independently selected from the group consisting of hydrogen and substituted and unsubstituted alkyl group. In this embodiment, the oligomers and the polymers are obtained from above named monomeric basic safranine dye represented by formula (P). Preferably, the oligomers and the polymers are obtained from above named monomeric basic safranine dye represented by formula (P) by one of the method described hereinbelow.

Above monomeric basic safranine dye is cationic and thus a counterion is usually present. Any anion (or group of anions) having sufficient charges may be used as counterion(s). Such counterion is preferably selected from the group consisting of hydroxide, hydrogensulfate, sulfate, methanesulfonate, acetate, chloride, bromide, iodide, toluenesulfonate and methanesulfate ($CH_3$—O—$SO_3$-). More preferably, said counterion is selected from the group consisting of chloride, acetate, hydrogensulfate and sulfate, even more preferably chloride is used.

Typically, above counterions are used in quantities sufficient to neutralize the cationic charges of the basic safranine dye. It is for example sufficient if one sulfate ion is present for two monomeric basic safranine dyes to satisfy the underlying electroneutrality requirement.

Preferably, $R^{P1}$ is selected from the group consisting of hydrogen and substituted and unsubstituted C1-C4-alkyl group; $R^{P1}$ more preferably is hydrogen.

Preferably, $R^{P2}$ is selected from the group consisting of hydrogen and substituted and unsubstituted C1-C4-alkyl group; $R^{P2}$ more preferably is hydrogen.

Preferably, $R^{P3}$ is selected from the group consisting of hydrogen and substituted and unsubstituted C1-C4-alkyl group; $R^{P3}$ more preferably is hydrogen.

Preferably, $R^{P4}$ is selected from the group consisting of hydrogen and substituted and unsubstituted C1-C4-alkyl group; $R^{P4}$ more preferably is selected from the group consisting of hydrogen and substituted and unsubstituted C1-C2-alkyl group; $R^{P4}$ is even more preferably selected from the group consisting of hydrogen and methyl group, yet even more preferably $R^{P4}$ is a methyl group.

Preferably, $R^{P5}$ is selected from the group consisting of hydrogen and substituted and unsubstituted C1-C4-alkyl group; $R^{P5}$ more preferably is hydrogen.

Preferably, $R^{P6}$ is selected from the group consisting of hydrogen and substituted and unsubstituted C1-C4-alkyl group; $R^{P6}$ more preferably is selected from the group consisting of hydrogen and methyl group; even more preferably $R^{P6}$ is hydrogen.

Preferably, $R^{P7}$ is selected from the group consisting of hydrogen and substituted and unsubstituted C1-C4-alkyl group; $R^{P7}$ more preferably is selected from the group consisting of hydrogen and substituted and unsubstituted C1-C2-alkyl group; $R^{P7}$ is even more preferably selected from the group consisting of hydrogen and methyl group; yet even more preferably $R^{P7}$ is a methyl group.

Preferably, $R^{P8}$ is selected from the group consisting of hydrogen and substituted and unsubstituted C1-C4-alkyl group, substituted and unsubstituted phenyl group and substituted and unsubstituted tolyl group; $R^{P8}$ more preferably is selected from the group consisting of hydrogen, methyl group, unfunctionalized phenyl group and unfunctionalized tolyl group; $R^{P8}$ is even more preferably selected from the group consisting of hydrogen and methyl group; yet even more preferably $R^{P8}$ is hydrogen.

Preferably, $R^{P9}$ is selected from the group consisting of hydrogen and substituted and unsubstituted C1-C4-alkyl group; $R^{P9}$ more preferably is selected from the group consisting of hydrogen and substituted and unsubstituted C1-C2-alkyl group; $R^{P9}$ is even more preferably selected from the group consisting of hydrogen and methyl group, yet even more preferably $R^{P9}$ is hydrogen.

Preferably, $R^{P10}$ is selected from the group consisting of hydrogen and substituted and unsubstituted C1-C4-alkyl group; $R^{P10}$ more preferably is hydrogen.

Preferably, $R^{P11}$ is selected from the group consisting of hydrogen and substituted and unsubstituted C1-C4-alkyl group; $R^{P11}$ more preferably is selected from the group consisting of hydrogen and methyl group; even more preferably $R^{P11}$ is hydrogen.

Preferably, $R^{P12}$ is selected from the group consisting of hydrogen and substituted and unsubstituted C1-C4-alkyl group; $R^{P12}$ more preferably is selected from the group consisting of hydrogen and methyl group; even more preferably $R^{P12}$ is hydrogen.

Preferably, $R^{P13}$ is selected from the group consisting of hydrogen and substituted and unsubstituted C1-C4-alkyl group; $R^{P13}$ more preferably is hydrogen.

The following monomeric basic safranine dyes were found to be particularly useful as the at least one phenazine dye:

A1)

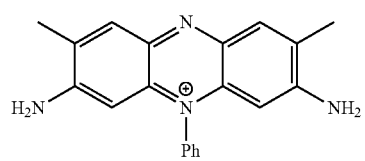

(3,7-diamino-2,8-dimethyl-5-phenylphenazin-5-ium, preferably with chloride as counterion known as Safranine T, Basic Red 2, CAS no. 477-73-6);

A2)

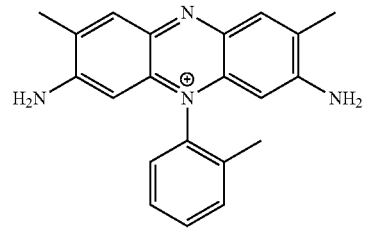 [SMILES: Cc1cc2nc3cc(C)c(N)cc3[n+](-c3ccccc3C)c2cc1N]

(3,7-diamino-2,8-dimethyl-5-(o-tolyl)phenazin-5-ium, preferably with chloride as counterion known as trimethyl safranine);

A3)

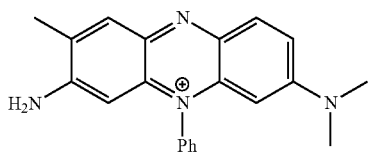

(3-amino-7-(dimethylamino)-2-methyl-5-phenylphenazin-5-ium, preferably with chloride as counterion known as Rhodulin Violet, CAS no. 23279-70-1);

A4)

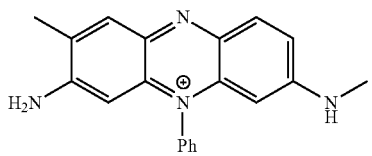 [SMILES: CNc1ccc2nc3cc(C)c(N)cc3[n+](-c3ccccc3)c2c1]

(3-amino-2-methyl-7-(methylamino)-5-phenylphenazin-5-ium, preferably with chloride as counterion known as Rhodulin Red, CAS no. 10130-52-6);

A5)

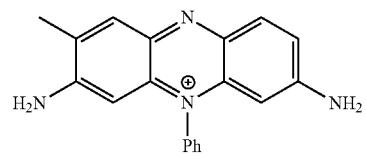 [SMILES: Cc1cc2nc3ccc(N)cc3[n+](-c3ccccc3)c2cc1N]

(3,7-diamino-2-methyl-5-phenylphenazin-5-ium, preferably with chloride as counterion known as phenosafranin, CAS no. 81-93-6);

A6)

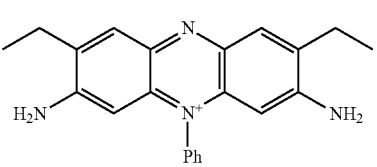 [SMILES: CCc1cc2nc3cc(CC)c(N)cc3[n+](-c3ccccc3)c2cc1N]

(3,7-Diamino-2,8-diethyl-5-phenyl-phenazinium, preferably with chloride as counterion)
A7)

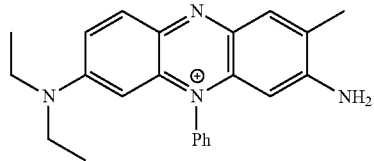 [SMILES: CCN(CC)c1ccc2nc3cc(C)c(N)cc3[n+](-c3ccccc3)c2c1]

(3-amino-7-N,N-diethylamino-2-methyl-5-phenylphenazinium);
A8)

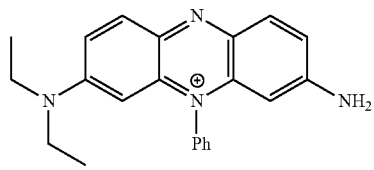 [SMILES: CCN(CC)c1ccc2nc3ccc(N)cc3[n+](-c3ccccc3)c2c1]

3-Amino-7-(diethylamino)-5-phenylphenazinium, preferably with chloride as counterion, CAS no. 4569-86-2);
A9)

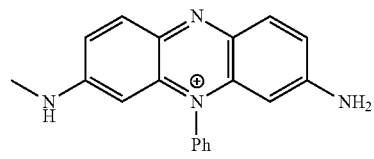 [SMILES: CNc1ccc2nc3ccc(N)cc3[n+](-c3ccccc3)c2c1]

(3-amino-7-(methylamino)-5-phenylphenazin-5-ium, preferably with acetate or chloride as counterion, known as Methylene Violet with chloride as counterion)
A10)

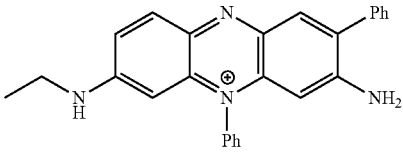 [SMILES: CCNc1ccc2nc3cc(-c4ccccc4)c(N)cc3[n+](-c3ccccc3)c2c1]

(3-amino-7-(ethylamino)-2,5-diphenylphenazin-5-ium, preferably chloride as counterion)
A11)

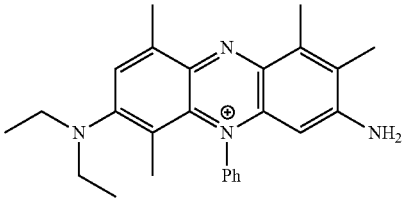 [SMILES: CCN(CC)c1cc(C)c2nc3c(C)c(C)c(N)cc3[n+](-c3ccccc3)c2c1C]

(3-amino-7-(diethylamino)-1,2,6,9-tetramethyl-5-phenylphenazin-5-ium, preferably with hydrogen sulfate as counterion)
A12)

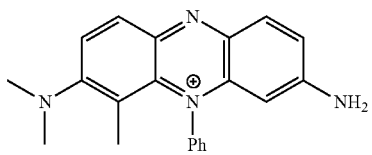 [SMILES: Cc1c(N(C)C)ccc2nc3ccc(N)cc3[n+](-c3ccccc3)c12]

(7-amino-3-(dimethylamino)-4-methyl-5-phenylphenazin-5-ium, preferably with hydrogen sulfate as counterion)
A13)

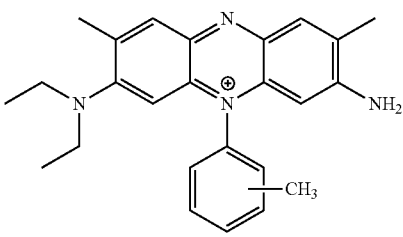

(3-amino-7-(diethylamino)-2,8-dimethyl-5-(o-tolyl)phenazin-5-ium, preferably chloride as counterion)
A14)

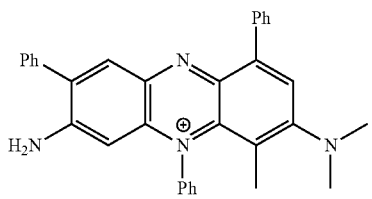 [SMILES: Cc1c(N(C)C)cc(-c2ccccc2)c2nc3cc(-c4ccccc4)c(N)cc3[n+](-c3ccccc3)c12]

(7-amino-3-(dimethylamino)-4-methyl-1,5,8-triphenylphenazin-5-ium, preferably with hydrogen sulfate as counterion)
A15)

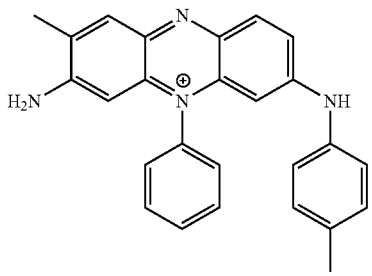

(3-amino-2-methyl-5-phenyl-7-(p-tolylamino)
phenazin-5-ium, mauveine A),
A16)

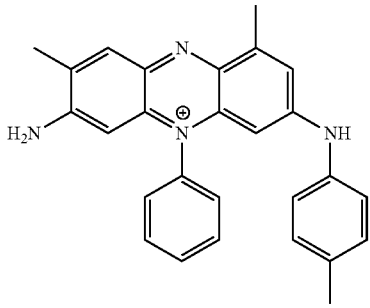 [SMILES: Cc1ccc(Nc2cc(C)c3nc4cc(C)c(N)cc4[n+](-c4ccccc4)c3c2)cc1]

(7-amino-1,8-dimethyl-5-phenyl-3-(p-tolylamino)
phenazin-5-ium, mauveine B, CAS no. 153343-19-2),
A17)

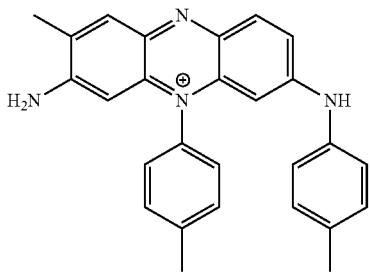 [SMILES: Cc1ccc(Nc2ccc3nc4cc(C)c(N)cc4[n+](-c4ccc(C)cc4)c3c2)cc1]

(3-amino-2-methyl-5-(p-tolyl)-7-(p-tolylamino)
phenazin-5-ium, mauveine B2),
A18)

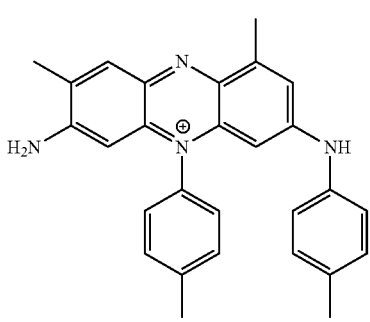 [SMILES: Cc1ccc(Nc2cc(C)c3nc4cc(C)c(N)cc4[n+](-c4ccc(C)cc4)c3c2)cc1]

(7-amino-1,8-dimethyl-5-(p-tolyl)-3-(p-tolylamino)
phenazin-5-ium, mauveine C),
A19)

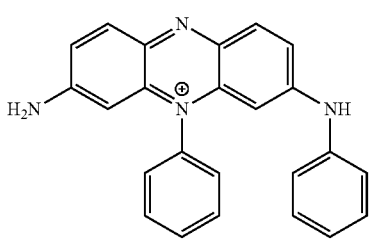 [SMILES: Nc1ccc2nc3ccc(Nc4ccccc4)cc3[n+](-c3ccccc3)c2c1]

(3-amino-5-phenyl-7-(phenylamino)phenazin-5-ium,
pseudo-mauvine),
A20)

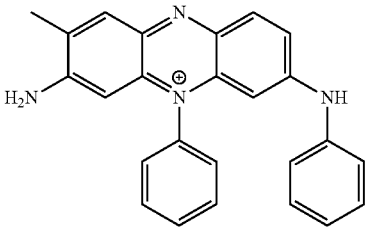 [SMILES: Cc1cc2nc3ccc(Nc4ccccc4)cc3[n+](-c3ccccc3)c2cc1N]

(3-amino-2-methyl-5-phenyl-7-(phenylamino)
phenazin-5-ium, mauvine C25a),
A21)

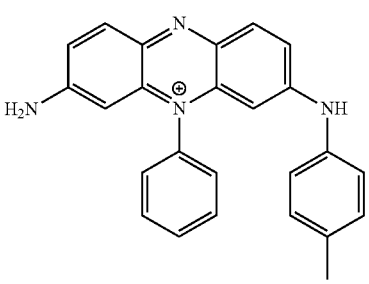 [SMILES: Cc1ccc(Nc2ccc3nc4ccc(N)cc4[n+](-c4ccccc4)c3c2)cc1]

(3-amino-5-phenyl-7-(p-tolylamino)phenazin-5-ium,
mauvine C25b),
A22) a mixture of two or more of the aforementioned.

Additionally, mauvine (CAS no. 6373-22-4) may also be used, being a mixture encompassing inter alia the compounds A15) to A21).

In the art, there are various methods of how to prepare oligomeric and polymeric basic safranine dyes based on the monomeric basic safranine dye such as the monomeric phenazine dye represented by formula (P) and preferably, phenazine dyes A1) to A21). In DE 20 28 803 A1 and DE 20 39 831 A1 the formation of poly(safranines) is reported. The reaction protocol described therein comprises the steps 1) an acidification with a strong Brønsted acid such as sulfuric acid; 2) diazotization with nitrosyl sulfuric acid (H$_2$SO$_4$/HNO$_2$) followed by removal of the excess of nitrous acid and 3) neutralization with a base such as potassium hydroxide. Such reaction is referred to herein as diazotization coupling reaction.

Further, a Pschorr coupling of is reported in WO 2004/057061 A1. This Pschorr coupling includes the formation of a diazo compound of a basic safranine dye in the presence of metallic copper and a strong acid such as tetrafluoroboric acid with sodium nitrite by which the oligomerization and/or polymerization already occurs. Thereafter, the reaction mixture is transferred into caustic soda to precipitate the oligomers and/or polymers. This is reaction is herein referred to as Pschorr coupling oligomerization and/or polymerization.

A further form of polymerization is described in WO 2012/040417 A1, possibly based on an azo coupling type reaction. A basic safranine dye is diazotized in an organic acid such as formic acid, followed by addition of sulfamic acid to remove any excess nitrous acid. The oligomerization and/or polymerization does not lead to the formation of gas (nitrogen), thus the oligomers and/or polymers are possibly linked by a diazo group. This is reaction is herein referred to as azo coupling oligomerization and/or polymerization.

All of the methods named hereinbefore for oligomerization and polymerization described above require that at least $R^{P2}$ and $R^{P3}$ and/or $R^{P8}$ and $R^{P9}$ are selected to be hydrogen as otherwise no diazo compound can be obtained which is necessary as intermediate. A further type of oligomerization and/or polymerization is described in R. Pauliukaite et al., Thin Solid Films 2009, volume 517, p. 5435-5441. This type of oligomerization and polymerization is based on an electropolymerization in a solution comprising nitrate at varying pH values. Above described methods may also be used in oligomerizing or polymerizing other phenazine dyes.

It is preferable that the oligomers and polymers obtained from above named monomeric basic safranine dye such as phenazine dyes A1) to A21) obtained from one of above-mentioned reactions. It is more preferable that the oligomers and polymers obtained from above named monomeric basic safranine dye such as phenazine dyes A1) to A21) are obtained by one of the following reaction types:
- diazotization coupling reaction;
- Pschorr coupling oligomerization and/or polymerization; and
- azo coupling oligomerization and/or polymerization.

In one embodiment of the present invention, the at least one phenazine dye is selected from the group consisting of monomeric basic safranine dyes A1) to A21), oligomers and polymers obtained therefrom and mixtures of the aforementioned. More preferably, the at least one phenazine dye is selected from the group consisting of monomeric basic safranine dyes A1) to A14), oligomers and polymers obtained therefrom and mixtures of the aforementioned. Even more preferably, the at least one phenazine dye is selected from the group consisting of monomeric basic safranine dyes A1) to A9), oligomers and polymers obtained therefrom and mixtures of the aforementioned. Yet even more preferably, the at least one phenazine dye is selected from the group consisting of monomeric basic safranine dyes A1) to A5), oligomers and polymers obtained therefrom and mixtures of the aforementioned. Preferably, oligomers and polymers are obtained by one of the preferred methods described above.

Alternatively, one or more of the following oligomeric and polymeric phenazine dyes may also be used as the at least one phenazine dye:
B1) oligo- or poly(6-methyl-7-dimethylamino-5-phenyl phenazonium sulfate);
B2) oligo- or poly(2-methyl-7-diethylamino-5-phenyl phenazonium chloride);
B3) oligo- or poly(2-methyl-7-dimethylamino-5-phenyl phenazonium sulfate);
B4) oligo- or poly(5-methyl-7-dimethylamino phenazonium acetate);
B5) oligo- or poly(2-methyl-7-anilino-5-phenyl phenazonium sulfate);
B6) oligo- or poly(2-methyl-7-dimethylamino phenazonium sulfate);
B7) oligo- or poly(7-methylamino-5-phenyl phenazonium acetate);
B8) oligo- or poly(7-ethylamino-2,5-diphenyl phenazonium chloride);
B9) oligo- or poly(2,8-dimethyl-7-diethylamino-5-p-tolyl-phenazonium chloride);
B10) oligo- or poly(2,5,8-triphenyl-7-dimethylamino phenazonium sulfate); and
B11) oligo- or poly(7-dimethylamino-5-phenyl phenazonium chloride).

In one embodiment of the present invention, the total concentration of the at least one phenazine dye ranges from 0.01 to 100 mg/L, preferably from 0.05 to 50 mg/L, more preferably from 0.1 to 20 mg/L, even more preferably from 0.2 to 10 mg/L, still even more preferably from 0.25 to 7 mg/L, most preferably from 0.5 to 5 mg/L. Concentrations above said maximum thresholds occasionally may result in defects in the deposited copper or copper alloy layers such as blisters and pitting. Concentrations below said minimum thresholds may not always be effective enough. It is one advantage of the present invention that the concentration of the at least one phenazine dye can be decreased compared to the prior art without compromising the desired properties of the inventive plating composition for electrolytic copper deposition.

The inventive plating composition comprises at least one ethanediamine derivative according to formula (ED). The at least one ethanediamine derivative according to formula (ED) is abbreviated herein as "ethanediamine derivative".

Preferably, $R^{ED1}$, $R^{ED2}$, $R^{ED3}$ and $R^{ED4}$ are independently represented by formula (ED-1)

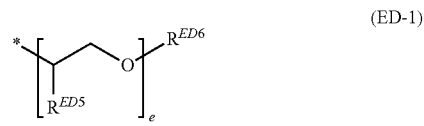

(ED-1)

wherein
each $R^{ED5}$ is independently selected from the group consisting of hydrogen, alkyl group and aryl group;
each $R^{ED6}$ is independently selected from the group consisting of hydrogen, substituted and unsubstituted C1-C8-alkyl group, substituted and unsubstituted aryl group; and
each e is independently an integer ranging from 1 to 25.

In formula (ED-1), the carbon atoms bearing group $R^{ED5}$ are attached to the nitrogen atoms of the ethanediamine derivative represented by formula (ED).

More preferably, at least one, even more preferably two, yet even more preferably three, still even more preferably all, of $R^{ED6}$ is selected to be a substituted and unsubstituted of $R^{ED6}$ is selected to be a C1-C8-alkylsulfonic acid group, even more preferably $R^{ED6}$ is selected to be a substituted and unsubstituted C2-C6-alkylsulfonic acid group.

Yet even more preferably, at least one, preferably two, more preferably three, even more preferably all, of $R^{ED6}$ is selected to be

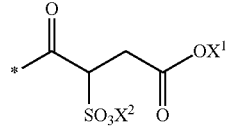

wherein each of $X^1$ and $X^2$ is independently hydrogen, a metal atom or any other cation forming radical. Said metal atom or cation forming radical has a charge sufficient to satisfy the underlying electroneutrality requirement. Preferred metal ions are selected from the group consisting of alkaline metal ions such as lithium, sodium, potassium and earth alkaline metal ions. A preferred cation forming radical is ammonium. More preferably, each of $X^1$ and $X^2$ is independently hydrogen or an alkaline metal ion; even more preferably, each of $X^1$ and $X^2$ is independently hydrogen, sodium or potassium.

Preferably, each $R^{ED5}$ is independently selected from the group consisting of hydrogen, substituted and unsubstituted C1-C4-alkyl group and substituted and unsubstituted phenyl group; more preferably, each $R^{ED5}$ is independently selected from the group consisting of hydrogen, methyl group and ethyl group; even more preferably, each $R^{ED5}$ is independently selected from the group consisting of hydrogen and methyl.

e preferably ranges from 2 to 20, more preferably from 5 to 12 and even more preferably from 6 to 9.

In a preferred embodiment of the present invention, the e in one or more of $R^{ED1}$, $R^{ED2}$, $R^{ED3}$ and/or $R^{ED4}$, is 2 or greater and at least two $R^{ED5}$ are selected to be different from each other. Thus, one or more of $R^{ED1}$, $R^{ED2}$, $R^{ED3}$ and $R^{ED4}$ comprise a copolymer (or a corresponding oligomer). Preferably, in this embodiment, said copolymer is a block-copolymer (or a corresponding block-oligomer). It is particularly preferred that all of $R^{ED1}$, $R^{ED2}$, $R^{ED3}$ and $R^{ED4}$ comprise copolymers, preferably block-copolymers.

In one embodiment of the present invention, the at least one ethanediamine derivative has a weight average molecular weight $M_w$ ranging from 200 to 6000 amu (i.e. 200 to 6000 g/mol), preferably from 400 to 4000 amu and more preferably from 600 to 2500 amu. The weight average molecular weight $M_w$ can be determined by HPLC-MS. Alternatively, the weight average molecular weight $M_w$ can be determined by NMR or gel permeation chromatography using suitable standards. In some references in the art, the weight average molecular weight is also referred to as mass average molecular mass.

Preferably, the total concentration of the at least one ethanediamine derivative according to formula (ED) ranges from 1 to 1000 mg/L, preferably from 10 to 500 mg/L and more preferably from 50 to 400 mg/L.

Optionally, a redox couple, such as $Fe^{2+/3+}$ ions is contained in the inventive plating composition. Such a redox couple is particularly useful, if reverse pulse plating is used in combination with inert anodes for copper deposition. Suitable processes for copper plating using a redox couple in combination with reverse pulse plating and inert anodes are for example disclosed in U.S. Pat. Nos. 5,976,341 and 6,099,711.

The inventive plating composition optionally comprises iron ions, i.e. ferrous ions and/or ferric ions. Said optional iron ions are added to the inventive plating composition as water soluble iron salts and/or iron complexes. Useful iron salts are for example ferrous sulfate and ferric sulfate. It is preferred that the concentration of the optional iron ions ranges from 0 to 1000 mg/l, even more preferably from 50 to 700 mg/l and yet even more preferably from 100 to 400 mg/l.

The inventive plating composition optionally comprises at least one brightener, preferably selected from the group consisting of 3-(benzthiazolyl-2-thio)-propylsulfonic-acid, 3-mercaptopropan-1-sulfonic acid, ethylendithiodipropylsulfonic acid, bis-(p-sulfophenyl)-disulfide, bis-(ω-sulfobutyl)disulfide, bis-(ω-sulfohydroxypropyl)-disulfide, bis-(ω-sulfopropyl)-disulfide, bis-(ω-sulfopropyl)sulfide, methyl-(ω-sulfopropyl)-disulfide, methyl-(ω-sulfopropyl)-trisulfide, O-ethyl-dithiocarbonicacid-S-(ω-sulfopropyl)-ester, thioglycol-acid, thiophosphoric acid-O-ethyl-bis-(ω-sulfopropyl)-ester, 3-N,N-dimethylaminodithiocarbamoyl-1-propanesulfonic acid, 3,3f-thiobis(1-propanesulfonic acid), thiophosphoric-acid-tris-(ω-sulfopropyl)-ester and their corresponding salts. Preferably, the total concentration of the at least one optional brightener ranges from 1 to 1000 mg/L, more preferably from 5 to 100 mg/L and even more preferably from 10 to 50 mg/L.

Preferably, the pH value of the inventive plating composition is 3 or less, more preferably 2 or less, even more preferably 1 or less.

Optionally, the inventive plating composition comprises at least one wetting agent. Preferably, the at least one wetting agent is a non-ionic wetting agent. This non-ionic wetting agent is preferably selected from the group consisting of polyalkanediyl (polyalkylene) glycols like polyethylene glycol, polypropylene glycol and polyethylene polypropylene glycol and alkoxylates (polyoxyalkanediyl compounds) such as alkoxylated α-naphthol, alkoxylated β-naphthol, alkanol alkoxylate like octanol alkoxylate and glycerol alkoxylate, alkaryl alkoxylate like nonylphenol alkoxylate, fatty acid alkoxylates like oleic acid alkoxylate and stearic acid alkoxylate.

Optionally, the inventive plating composition comprises at least one oxygenated high molecular compound selected from the group consisting of polyvinyl alcohol and carboxyalkyl cellulose such as carboxymethyl cellulose.

Other components may be added to the inventive plating composition such as bases, buffers, complexing agents (also referred to as chelating agents), stabilizing agents, reducing agents and the like. These components and suitable concentration thereof are known in the art.

The inventive plating composition may be prepared by dissolving all components in aqueous liquid medium, preferably in water.

The inventive method comprises steps i) to iii). The steps are carried out in the given order but not necessarily in immediate succession. In step i) of the inventive method, the substrate is provided. The substrate has at least one surface which is suitable for electrolytically depositing a copper or copper alloy layer thereon.

Preferably, the substrate is selected from the group consisting of conductive and non-conductive substrates. Conductive substrates include metallic substrates such as brass or zinc based die-cast. Non-conductive substrates include plastics such as acrylonitrile-butadiene-styrene (ABS), polycarbonate/acrylonitrile-butadiene-styrene (PC/ABS), polyamide (PA) and polyethylene imine, glass and silicon. The substrates may be made in their entirety of above materials or they only comprise at least one surface made thereof. Thus, an item mostly made of plastic but having a metallic surface whereon the plating is to be carried out, is considered herein as a metallic substrate. The same applies to a lacquer layer comprising metallic particles (which render the whole layer conductive). Conductive substrates are preferred. More preferred are metallic substrates. Metallic substrates comprising at least one metal selected from the group consisting of copper, palladium, silver, zinc, mixtures and alloys thereof are even more preferred. Typically applied alloys are for example copper alloys such as brass and bronze and nickel alloys such as nickel phosphorus, nickel boron and nickel phosphorus boron. Conventional alloys for zinc comprise small amounts of (5 wt. % or less) of aluminum, magnesium and/or copper.

Optionally, the substrate (in particular the at least one surface thereof) is subjected to one or more pre-treatment steps. Typically applied pre-treatment steps are etching steps, cleaning steps and activation steps. Such pre-treatment steps are known in the art.

In step ii) of the inventive method, the substrate is contacted with the inventive plating composition. In step iii) of the inventive method, an electrical current is applied between the substrate and at least one anode; and thereby said layer is deposited onto the at least one surface of the substrate.

The temperature of the inventive plating composition during deposition preferably ranges from 10 to 60° C., more preferably from 15 to 50° C. and even more preferably from 20 to 40° C.

The cathodic current density may vary over a wide range. Preferably, it ranges from 0.5 to 12 A/dm$^2$, more preferably from 1 to 8 A/dm$^2$ and more preferably from 2 to 6 A/dm$^2$. It is one advantage of the present invention that a wide range of cathodic current density can be applied without any loss of levelling properties or gloss and brightness of the copper or copper alloy deposits.

The duration of the deposition depends inter alia on the desired thickness of the copper or copper alloy layer. Typical duration are from 10 to 120 min, preferably from 15 to 100 min and more preferably from 20 to 80 min.

Optionally, mixing of the inventive plating composition during deposition is achieved by a strong flow and, at need, by blowing clean air into the mixture so that the surface of the inventive plating composition is strongly agitated. As a result, the transport of substances in proximity to the electrodes is maximized, which makes it possible to achieve higher current densities. It is moreover possible to enhance the transport of substances at the respective surfaces by causing the cathodes to move. Thanks to the thus increased convection and to the movement of the electrodes, constant, diffusion-controlled deposition is performed. The electrodes may be moved horizontally, vertically and/or by vibration or ultrasound for example. This is particularly effective in combination with air being blown in.

Any anode may be used in the context of the present invention. The copper content of the inventive plating composition can be electrochemically replenished, during deposition, using soluble copper anodes. Soluble copper anodes are thus preferred. The anode material used is more preferably copper containing 0.02 to 0.06 wt.-% phosphorus.

In order to prevent dirt accumulation on the copper anodes, they should be sealed from the electrolyte by anode bags. Inert anodes may be used as an alternative. In this case, the copper content must be replenished otherwise, e.g. from a separate dissolution compartment.

Optionally, filters for retaining mechanical and/or chemical residues may be inserted into the plating composition's circulation system. This advantageously helps to maintain the quality of the inventive plating composition during use. If soluble copper anodes are used, filtration is highly recommended because the phosphorus causes anode sludge to form which can disturb the deposition process. Using inert anodes, the quality of the solution may be maintained at less expense.

Horizontal or vertical conveyorized plating lines may be used in the inventive method to deposit a copper or copper alloy layer onto at least one surface of a substrate.

The inventive method optionally comprises rinsing steps, preferably with water, and/or drying steps, e.g. of the substrate after depositing the copper or copper alloy layer thereon.

Preferably, the thickness of the copper or copper alloy deposited on the at least one surface of the substrate ranges from 5 to 100 μm, more preferably from 7.5 to 70 μm and even more preferably from 10 to 40 μm.

It is possible within the inventive method to replenish one or more of components such as the at least one benzothiazole compound, the at least one phenazine dye and the at least one ethanediamine derivative. Typically, many of the plating composition of the prior art quickly lose their performance which in part may be restored by replenishment of the components of the plating composition. Surprisingly, it was found by the inventors that the inventive plating composition can be used for a prolonged period of time without requiring any replenishment, e.g. of above components. Thereby, the inventive plating composition needs less maintenance and is less prone to failure as the individual components do not have to be monitored as closely as in the prior art.

EXAMPLES

The invention will now be illustrated by reference to the following non-limiting examples. Commercial products were used as described in the technical datasheet available on the date of filing of this specification unless stated otherwise hereinafter. Tetronic® 304 (an ethanediamine derivative represented by the following formula (ED)) is a product of BASF SE. The substrate materials in all examples were brass sheets having a size of 100 mm×75 mm.

Measurement of Roughness:

The roughness (or smoothness) of the outer surface was determined by a scanning atomic force microscope (Digital Instruments, NanoScope equipped with a PointProbe® from Nanosensors with a tip radius of less than 7 nm), scan size: 5×5 μm, scan in tapping mode. $S_A$ values (averaged roughness) were obtained by these measurements and are provided with the respective examples below. To be able to better compare the roughness values, identical positions were used for the individual measurements. Said positions correspond to 2 ASD and 4 ASD of one of above substrates when plated in a Hull cell.

Measurement of the Leveling Effect:

For levelling effect measurements, the substrates were scratched with a conventional household cleaning sponge's rough side applying identical force on all substrates (prior to treating them with the plating composition described below). As a comparison for the plated substrates, they were compared to a substrate which was scratched identically but which was not treated with a plating composition. Such substrate is referred to herein as "scratched virgin substrate". In the examples below, the difference of the scratched virgin substrate is compared to the substrates treated with the plating composition described hereinafter and referred to as "levelling effect".

Comparative Example 1: No Benzothiazole Compound and No Ethanediamine Derivative A plating composition comprising the following components was prepared by dissolving the named components in water:

| | |
|---|---|
| $CuSO_4 \times 5\ H_2O$ | 220.0 g/L |
| Sulfuric acid (96% per weight) | 70.0 g/L |
| NaCl | 160 mg/L |
| iron ions | 100 mg/L |
| β-naphthol-ethoxylate ($M_w$ 600 g/mol) | 200 mg/L |
| polymeric safranine | 3 mg/L |
| bis-(ω-sulfopropyl)-disulfide | 30 mg/L |

The plating composition was used in a Hull cell to plate on substrates with the following parameters: current 2 A per panel, temperature 25° C., time: 10 min, air injection using phosphorus-containing soluble copper anodes.

The resulting roughness was 80.8 nm (at 2 ASD) corresponding to a levelling effect of 16% compared to the scratched virgin substrate. The roughness $S_A$ of the scratched virgin substrate was 96.5 nm.

Comparative Example 2: No Ethanediamine Derivative

The plating composition of Comparative Example 1 was used which additionally contained:

| | |
|---|---|
| thioflavin T | 6 mg/L |

The plating conditions were identical to those described in Comparative Example 1.

The resulting roughness $S_A$ was 70.0 nm (at 2 ASD) corresponding to a leveling effect of 27% compared to the scratched virgin substrate.

Comparative Example 3: No Benzothiazole Compound

The plating composition of Comparative Example 1 was used albeit with substituting β-naphtholethoxylate ($M_w$ 600 g/mol) for the following:

| | |
|---|---|
| Tetronic ® 304 | 200 mg/L |

The plating conditions were identical to those described in Comparative Example 1. The resulting roughness $S_A$ was 67.5 nm (at 2 ASD) corresponding to a levelling effect of 30% compared to the scratched virgin substrate.

Inventive Example 1

A plating composition comprising the following components was prepared by dissolving the named components in water:

| | |
|---|---|
| CuSO$_4$ × 5 H$_2$O | 220.0 g/L |
| Sulfuric acid (96% per weight) | 70.0 g/L |
| NaCl | 160 mg/L |
| iron ions | 100 mg/L |
| polymeric safranine | 3 mg/L |
| bis-(ω-sulfopropyl)-disulfide | 30 mg/L |
| Tetronic ® 304 | 200 mg/L |
| thioflavin T | 6 mg/L |

The plating conditions were identical to those described in Comparative Example 1. The resulting roughness $S_A$ was 46.6 nm (at 2 ASD) corresponding to a levelling effect of 52% compared to the scratched virgin substrate. The copper layers were glossy over the whole substrate and had a mirror-polished appearance. They additionally adhered well to the underlying substrate and were ductile as desired in the art.

Inventive Example 2: Preferred Embodiment

The plating composition of Inventive Example 1 was used but instead of Tetronic® 304, an ethanediamine derivative was used in the same concentration as Tetronic® 304 in Inventive Example 1. At least one of $R^{ED1}$ to $R^{ED4}$ of the ethanediamine derivative was

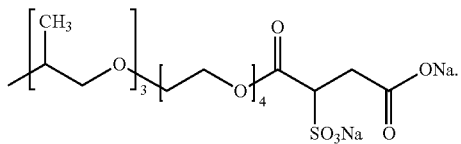

The remainder of $R^{ED1}$ to $R^{ED4}$ were

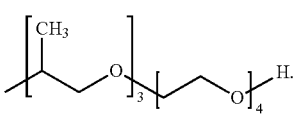

The plating conditions were identical to those described in Comparative Example 1. The resulting roughness $S_A$ was 40.7 nm (at 2 ASD) corresponding to a levelling effect of 58% compared to the scratched virgin substrate. By using above ethanediamine derivative (which is a preferred embodiment of the present invention), the roughness could be significantly decreased (40%) compared to comparative example 3.

Comparative Example 4: No Benzothiazole Compound

A plating composition comprising the following components was prepared by dissolving the named components in water:

| | |
|---|---|
| CuSO$_4$ × 5 H$_2$O | 220.0 g/L |
| Sulfuric acid (96% per weight) | 70.0 g/L |
| NaCl | 160 mg/L |
| iron ions | 100 mg/L |
| polymeric safranine | 3 mg/L |
| bis-(ω-sulfopropyl)-disulfide | 30 mg/L |
| ethanediamine derivative of Inventive Example 2 | 200 mg/L |

The plating composition was used in a Hull cell to plate on scratched virgin substrates with the following parameters: current per panel: 2 A, temperature: 25° C., time: 10 min, air injection using phosphorus-containing soluble copper anodes. Then, the roughness was measured and compared to below examples. Between the evaluation of the plating composition by plating with above parameters on scratched substrates, the plating composition was aged by passing a defined charge (see table) through the solution.

TABLE 1

| Comparative Example 4. | | |
|---|---|---|
| current density [A/dm$^2$] | Plating solution age | Increase of roughness compared to 1.3 Ah/L |
| 2 | 1.3 Ah/L | reference value |
| 2 | 4.0 Ah/L | 1% |
| 2 | 5.3 Ah/L | 73% |
| 2 | 6.7 Ah/L | 2%[1] |
| 2 | 8.0 Ah/L | 3% |

TABLE 1-continued

Comparative Example 4.

| current density [A/dm²] | Plating solution age | Increase of roughness compared to 1.3 Ah/L |
|---|---|---|
| 4 | 1.3 Ah/L | 0% |
| 4 | 4.0 Ah/L | 4% |
| 4 | 5.3 Ah/L | 43% |
| 4 | 6.7 Ah/L | −12%[1] |
| 4 | 8.0 Ah/L | 34% |

[1]after replenishment of the at least one phenazine dye.

The roughness of the copper layers increased over the prolonged use of the plating composition significantly. Thus, the levelling effect wore off and also, the layers lost gloss and brightness. The observed decline of properties is highly undesired as is renders the deposition prone to failure resulting potentially in scrap production.

Inventive Example 3

A plating composition comprising the following components was prepared by dissolving the named components in water:

| | |
|---|---|
| CuSO₄ × 5 H₂O | 220.0 g/L |
| Sulfuric acid (96% per weight) | 70.0 g/L |
| NaCl | 160 mg/L |
| iron ions | 100 mg/L |
| polymeric safranine | 3 mg/L |
| bis-(ω-sulfopropyl)-disulfide | 30 mg/L |
| thioflavin T | 2 mg/L |
| ethanediamine derivative of Inventive Example 2 | 200 mg/L |

The plating composition was used in a Hull cell to plate on substrates with the following parameters: current per panel: 2 A, temperature: 25° C., time: 10 min, air injection using phosphorus-containing soluble copper anodes. Then, the roughness was measured and compared to the examples below. Between the evaluation of the plating solution by plating with above parameters on scratched virgin substrates, the plating composition was aged by passing a defined charge (see table) through the composition.

TABLE 2

Inventive Example 3.

| current density [A/dm²] | Plating solution age | Increase of roughness compared to 1.3 Ah/L |
|---|---|---|
| 2 | 1.3 Ah/L | reference value |
| 2 | 4.0 Ah/L | 8% |
| 2 | 5.3 Ah/L | 6% |
| 2 | 6.7 Ah/L | −13%[1] |
| 2 | 8.0 Ah/L | −8% |
| 4 | 1.3 Ah/L | 0% |
| 4 | 4.0 Ah/L | 30% |
| 4 | 5.3 Ah/L | 31% |
| 4 | 6.7 Ah/L | 1%[1] |
| 4 | 8.0 Ah/L | −2% |

[1]after replenishment of the at least one phenazine dye and the at least one benzothiazole compound.

Although the initial roughness of the Inventive Example 3 (at 1.3 Ah/L) was already lower than the initial roughness of Comparative Example 4 (at 1.3 Ah/L) by approximately 12%, this effect of reduced roughness and thus improved levelling effect further increased when longer plating times were applied. When 5.3 Ah/L were reached, said effect was particularly visible. Therefore, the inventive plating composition allowed not only for an improved levelling effect initially but also for an improvement thereof during use compared to the state of the art. After replenishment of components (at 6.7 Ah/L) the effect of reduced roughness and thus improved levelling effect in Inventive Example 3 is obvious again when longer plating times were applied.

It was further found by the inventors that the roughness of the copper layers obtained in inventive example 3 at a given plating solution age was lower compared to those corresponding from comparative example 4. This was particularly the case when evaluated at low local current densities, for example 2 A/dm².

Other embodiments of the present invention will be apparent to those skilled in the art from a consideration of this specification or practice of the invention disclosed herein. It is intended that the specification and examples be considered as exemplary only, with the true scope of the invention being defined by the following claims only.

The invention claimed is:

1. A plating composition for electrolytic copper deposition, comprising copper ions, halide ions and at least one acid, characterized in that
the plating composition further comprises:
(a) at least one benzothiazole compound represented by the following formula (BT):

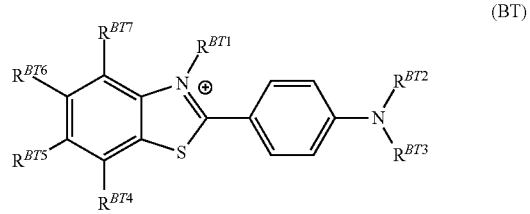

(BT)

wherein
$R^{BT1}$ is selected from the group consisting of substituted and unsubstituted alkyl group, substituted and unsubstituted aryl group and substituted and unsubstituted alkaryl group;
$R^{BT2}$ and $R^{BT3}$ are independently substituted and unsubstituted alkyl groups;
each of $R^{BT4}$, $R^{BT5}$, $R^{BT6}$ and $R^{BT7}$ are independently selected from the group consisting of hydrogen, substituted and unsubstituted alkyl group, substituted and unsubstituted oxyalkyl group and

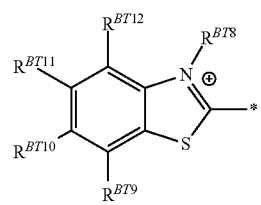

wherein $R^{BT8}$ is selected from the group consisting of substituted and unsubstituted alkyl group, substituted and unsubstituted aryl group and substituted and unsubstituted alkaryl group;

each of $R^{BT9}$, $R^{BT10}$, $R^{BT11}$ and $R^{BT12}$ are independently selected from the group consisting of hydrogen, substituted and unsubstituted alkyl group, substituted and unsubstituted oxyalkyl group and sulfonic acid group;
(b) at least one phenazine dye; and
(c) at least one ethanediamine derivative represented by the following formula (ED):

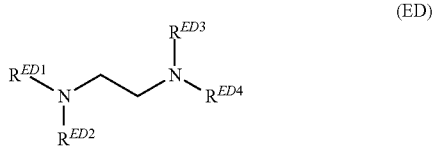

(ED)

wherein
$R^{ED1}$, $R^{ED2}$, $R^{ED3}$ and $R^{ED4}$ are independently selected from the group consisting of substituted and unsubstituted oligo(oxyalkanediyl) group; and substituted and unsubstituted poly(oxyalkanediyl) group, and
wherein the plating composition is free of intentionally added zinc ions.

2. The plating composition of claim 1 characterized in that one or more of the $R^{ED1}$, $R^{ED2}$, $R^{ED3}$ and $R^{ED4}$ is independently represented by formula (ED-1):

(ED-1)

wherein
each $R^{ED5}$ is independently selected from the group consisting of hydrogen, alkyl group and aryl group;
each $R^{ED6}$ is independently selected from the group consisting of hydrogen, substituted and unsubstituted C1-C8-alkyl group, substituted and unsubstituted aryl group; and
each e is independently an integer ranging from 1 to 25.

3. The plating composition of claim 2 characterized in that at least one of the $R^{ED6}$ is selected to be a C1-C8-alkylsulfonic acid group.

4. The plating composition of claim 3 characterized in that the at least one of the $R^{ED6}$ is selected to be

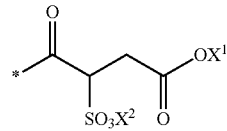

wherein each of $X^1$ and $X^2$ is independently hydrogen, a metal atom or any other cation forming radical.

5. The plating composition of claim 4 characterized in that each of the $R^{ED5}$ is independently selected from the group consisting of hydrogen and methyl group.

6. The plating composition of claim 3 characterized in that each of the $R^{ED5}$ is independently selected from the group consisting of hydrogen and methyl group.

7. The plating composition of claim 2 characterized in that each of the $R^{ED5}$ is independently selected from the group consisting of hydrogen and methyl group.

8. The plating composition of claim 1 characterized in that the at least one ethanediamine derivative has a weight average molecular weight $M_W$ ranging from 200 to 6000 amu.

9. The plating composition of claim 1 characterized in that the at least one phenazine dye is monomeric, oligomeric or polymeric.

10. The plating composition of claim 1 characterized in that the at least one phenazine dye is selected from the group consisting of eurhodine dyes, basic safranine dyes, acid safranine dyes, indulines, nigrosines and aniline black.

11. The plating composition of claim 1 characterized in that the at least one phenazine dye is selected from the group consisting of monomeric, oligomeric or polymeric basic safranine dyes, wherein the monomeric basic safranine dye is represented by formula (P):

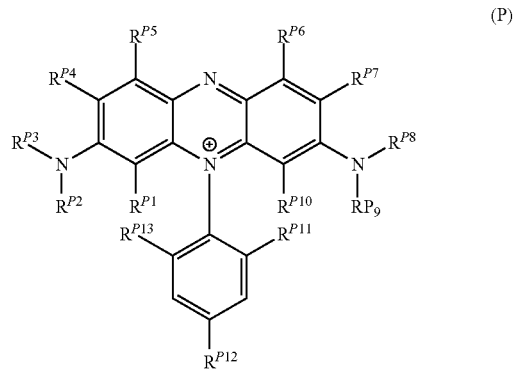

(P)

wherein
$R^{P1}$, $R^{P4}$, $R^{P5}$, $R^{P6}$, $R^{P7}$ and $R^{P10}$ are independently selected from the group consisting of hydrogen, substituted and unsubstituted alkyl group, substituted and unsubstituted aryl group and substituted and unsubstituted alkaryl group;
$R^{P2}$, $R^{P3}$, $R^{P8}$ and $R^{P9}$ are independently selected from the group consisting of hydrogen, substituted and unsubstituted alkyl group and substituted and unsubstituted aryl group and substituted and unsubstituted alkaryl group; and
$R^{P11}$, $R^{P12}$ and $R^{P13}$ are independently selected from the group consisting of hydrogen and substituted and unsubstituted alkyl group; and
the oligomers and the polymers are obtained from above named monomeric basic safranine dye.

12. The plating composition of claim 1 characterized in that the at least one phenazine dye is selected from the group consisting of:

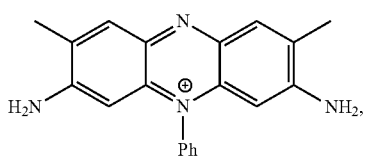

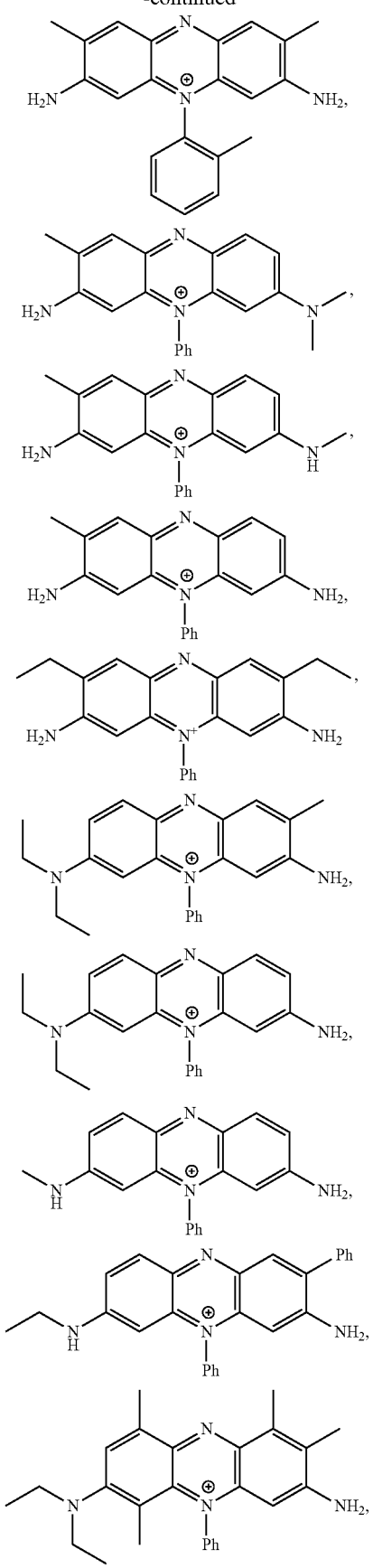
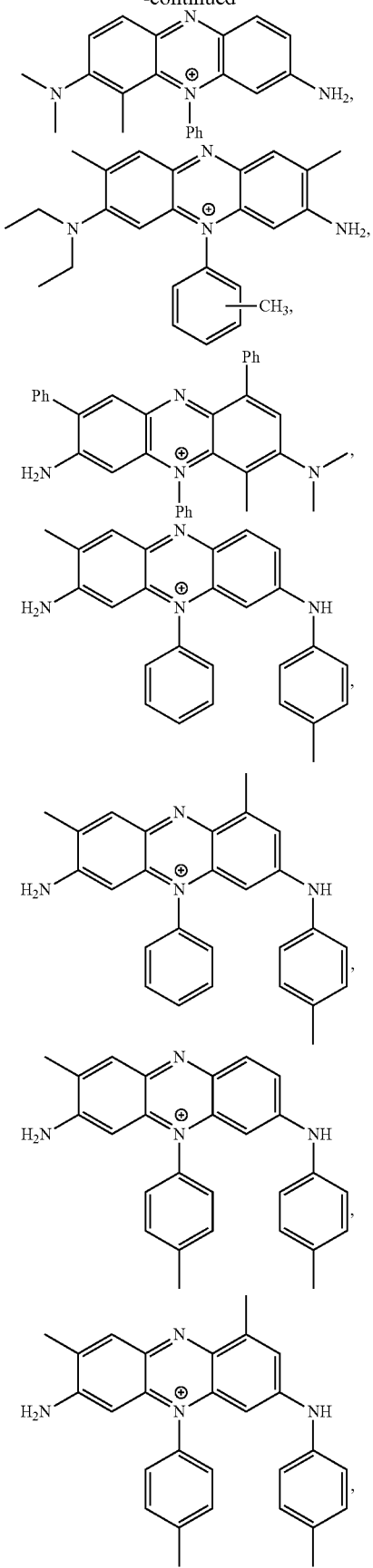

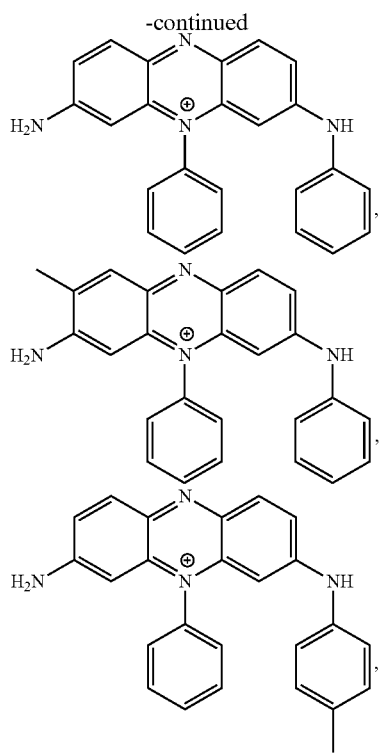

oligomers and polymers obtained therefrom and mixtures of the aforementioned.

13. The plating composition of claim 1 characterized in that the at least one acid is selected from the group consisting of sulfuric acid, organosulfuric acid, fluoroboric acid, phosphoric acid and mixtures of the aforementioned.

14. The plating composition of claim 1 characterized in that the at least one benzothiazole compound is represented by formula (BT-1):

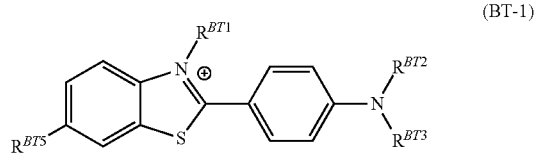
(BT-1)

wherein
$R^{BT1}$ is selected from the group consisting of substituted and unsubstituted C1-C3-alkyl group;
$R^{BT2}$ and $R^{BT3}$ are independently selected from methyl group and ethyl group;
$R^{BT5}$ is selected from the group consisting of methyl group, ethyl group, methoxy group, ethoxy group and

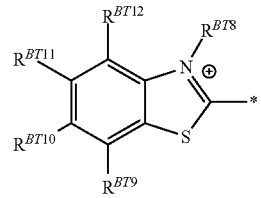

wherein $R^{BT8}$ is selected from the group consisting of methyl group and ethyl group and each of $R^{BT9}$, $R^{BT10}$, $R^{BT11}$ and $R^{BT12}$ are independently selected from the group consisting of hydrogen, methyl group, ethyl group and sulfonic acid group.

15. The plating composition of claim 1 characterized in that the plating composition further comprises at least one brightener.

16. The plating composition of claim 15 characterized in that the at least one brightener is selected from the group consisting of 3-(benzthiazolyl-2-thio)-propylsulfonic-acid, 3-mercaptopropan-1-sulfonic acid, ethylendithiodipropylsulfonic acid, bis-(p-sulfophenyl)-disulfide, bis-(ω-sulfobutyl)-disulfide, bis-(ω-sulfohydroxypropyl)-disulfide, bis-(ω-sulfopropyl)disulfide, bis-(ω-sulfopropyl)-sulfide, methyl-(ω-sulfopropyl)-disulfide, methyl(ω-sulfopropyl)-trisulfide, O-ethyl-dithiocarbonic-acid-S-(ω-sulfopropyl)-ester, thioglycol-acid, thiophosphoric acid-O-ethyl-bis-(ω-sulfopropyl)-ester, 3-N,N-dimethylaminodithiocarbamoyl-1-propanesulfonic acid, 3,3'-thiobis(1-propanesulfonic acid), thiophosphoric-acid-tris-(ω-sulfopropyl)-ester and their corresponding salts.

17. A method for electrolytically depositing a copper or copper alloy layer onto at least one surface of a substrate comprising the following method steps:
i) providing the substrate;
ii) contacting the substrate with the plating composition according to claim 1; and
iii) applying an electrical current between the substrate and at least one anode;
and thereby depositing said layer onto the at least one surface of the substrate.

* * * * *